Figure 4:
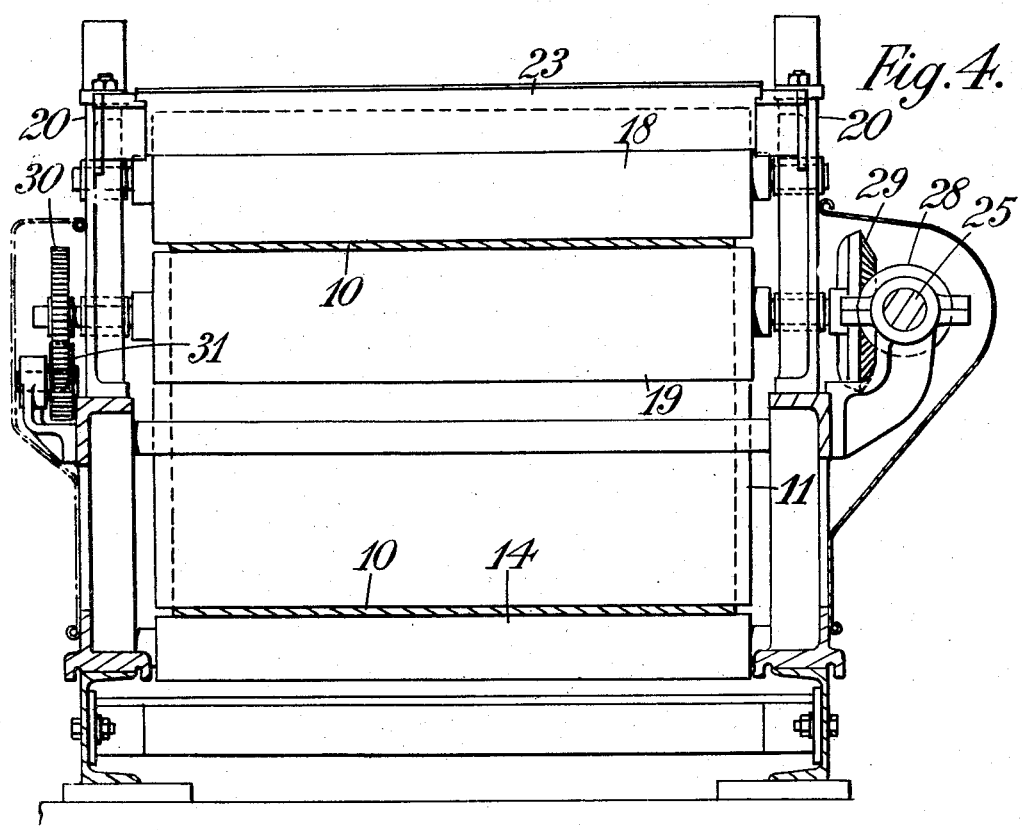

Jan. 27, 1959  R. H. TURNBULL  2,871,163
SEPARATION OF FIBRES FROM FIBROUS PLANTS
Filed Oct. 19, 1956  4 Sheets-Sheet 1
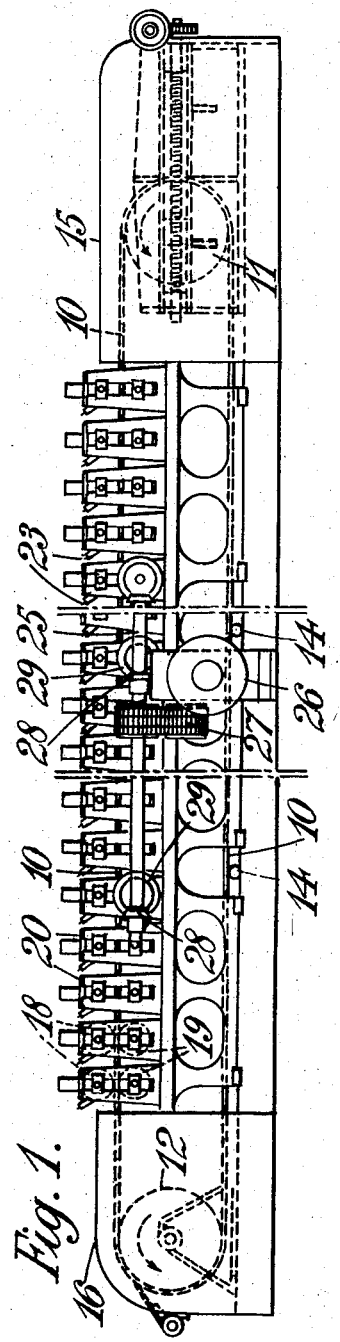
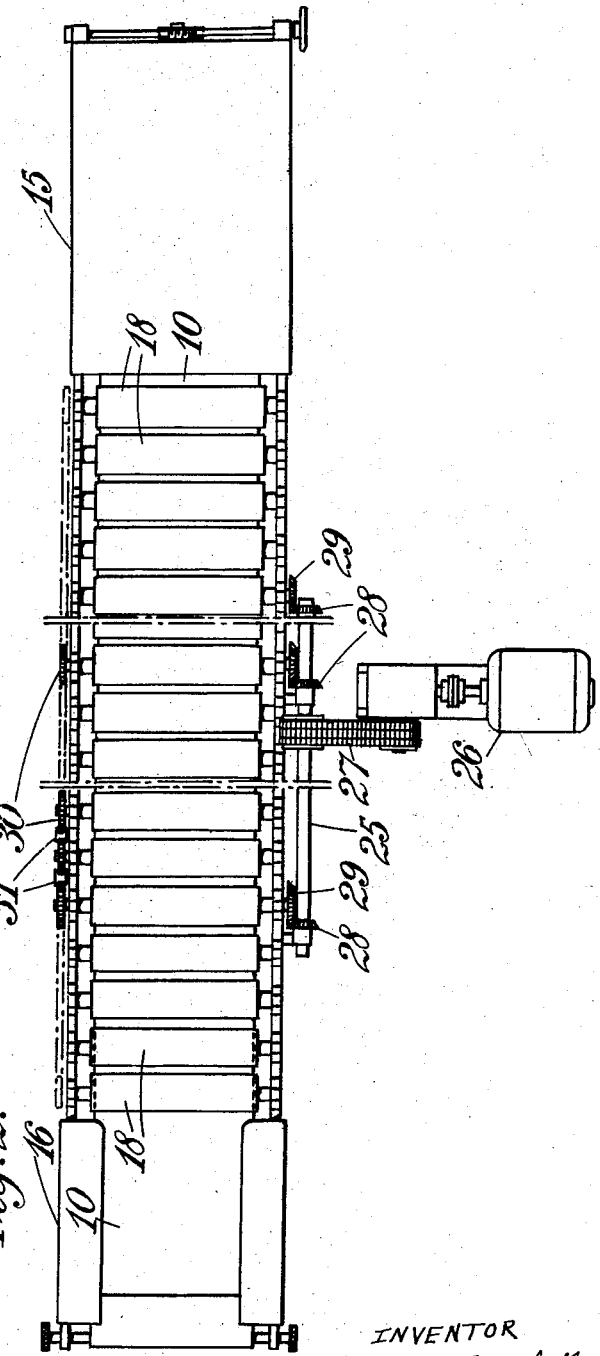
INVENTOR
Robert H. Turnbull
By Watson, Cole, Grindle &
Watson
ATTORNEYS

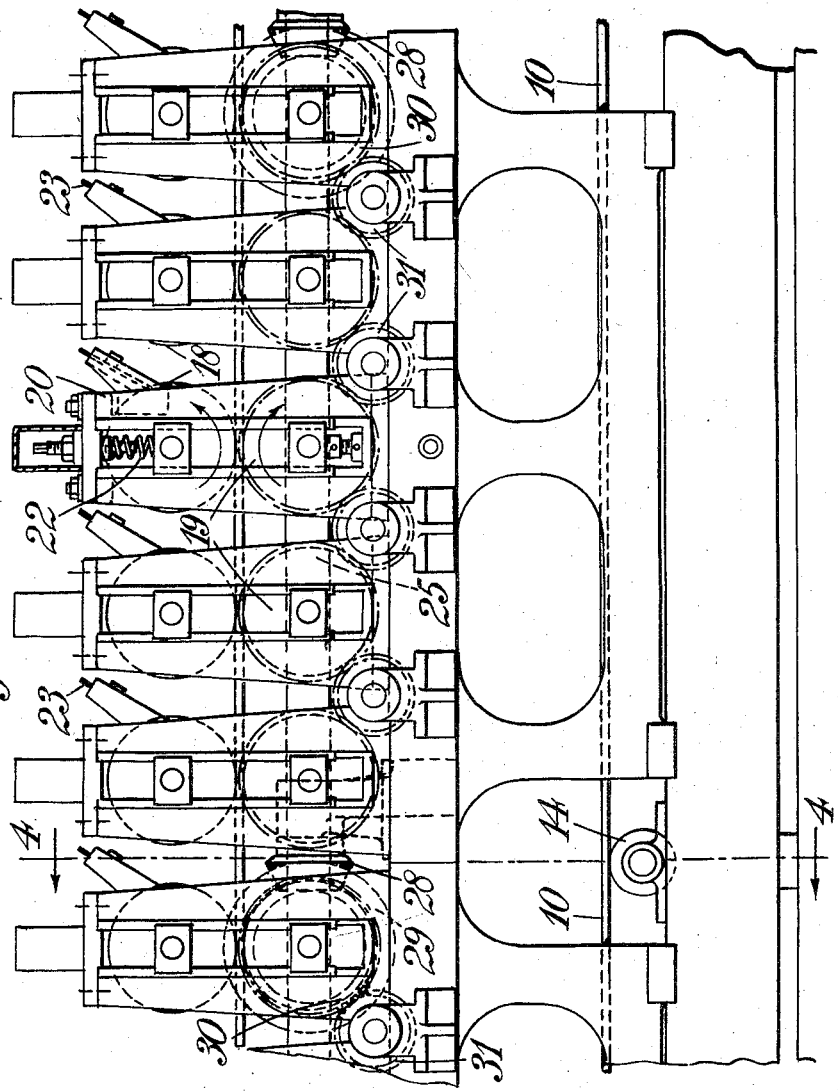

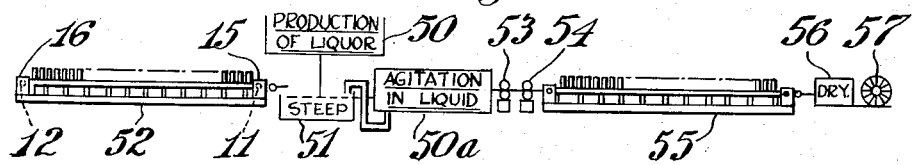
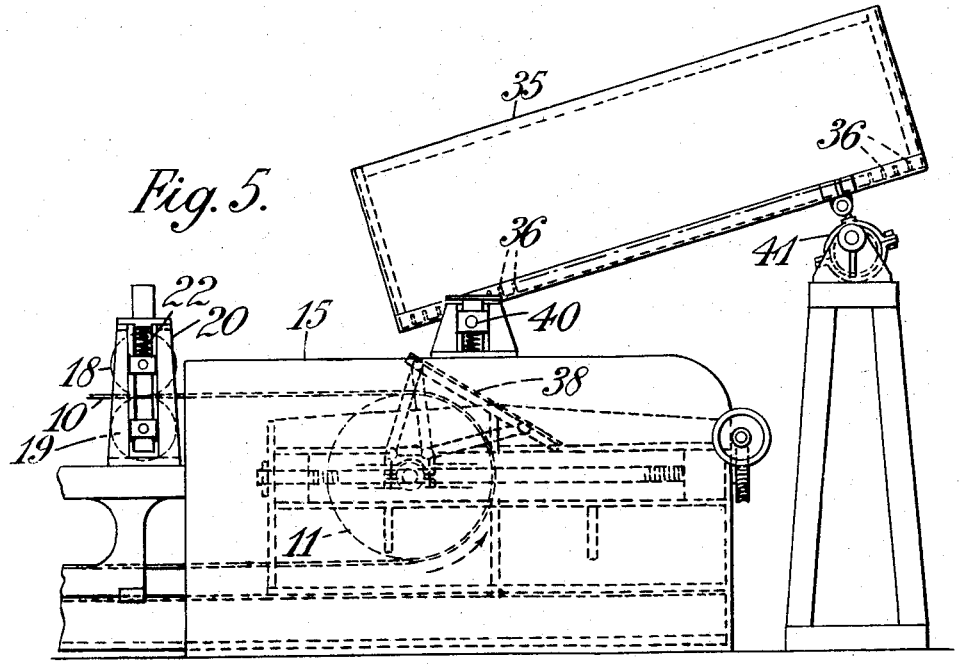

United States Patent Office 2,871,163
Patented Jan. 27, 1959

2,871,163

SEPARATION OF FIBRES FROM FIBROUS PLANTS

Robert Hutchison Turnbull, London, England

Application October 19, 1956, Serial No. 617,098

20 Claims. (Cl. 195—8)

The invention, which is a continuation-in-part of that disclosed in my application Serial No. 433,603 filed June 1, 1954, is concerned with the separation of fibres from the bark, wood and other tissues of fibre-containing plants such as jute, kenaf, ramie, flax, sisal, abaca (*Musa textilis*) and hemp (*Cannabis sativa*), and also with the softening of such fibres after separation in any manner.

At present the fibres of such plants are commonly separated, or loosened, by the usual process of retting which process involves prolonged soaking in water. This process is difficult to control and requires considerable time with excessive manual labour. It is also well known to treat some plants in decorticating machines but this treatment is not suitable for all the plants and has the disadvantages that it involves damage to the fibres and considerable waste. Further, proposals have been made to effect accelerated retting by chemical or bacteriological action.

It is an object of the invention to provide an improved process for the separation of the fibre from the bark, wood and other tissues of plants of the above kinds, more particularly with a view to the reduction of the time and labour required. A further object is the provision of softer fibres than has been hitherto obtainable in a practical manner.

The invention provides the process for the separation of the fibres from fibre-containing portions of plants which comprises the steps of preparing by extraction from plants of the same kind fresh cytase-containing liquor, crushing the said fibre-containing plant portions and treating the crushed portions for a period of one to four days at a temperature between 30° and 60° C. with said liquor to effect decomposition of the pectin or pectinaceous compounds of the plants to an extent substantially to free the fibres.

The invention also provides the process for the softening of sisal and like hard fibres which comprises treating the fibres with a liquor containing a cytase or cytases or a softening chemical or chemicals to effect a softening of the fibres and then repeatedly rolling the fibres to effect a further softening thereof.

The liquor may contain between 1% and 10% by weight of the cytase or cytases and the cytase or cytases may be obtained from the plants themselves, or other plants of the same kind by extraction of the juices either by crushing or by infusion in water.

The period of the treatment necessarily varies with the temperature, the kind and conditions of the plants or fibres being treated and other variable factors. In general however it will not be less than twelve hours and may be one or two days or even longer up to four days.

The cytase-containing liquor may be sprayed on to the plants or fibres throughout the period of heating or treating (e. g. at six hourly intervals). Alternatively, the plants may be steeped in the cytase-containing liquor during the treatment therewith.

The initial crushing of the plants facilitates access by the cytase to the pectinaceous binding materials and the heating produces conditions suitable for the rapid decomposition of the binding materials.

The fibres to be softened may be given a preliminary rolling before treatment with the liquor. This rolling may be carried out on the dry fibres or after a preliminary wetting with liquor.

The fibres may be treated with cytase-containing and chemical-containing liquors in succession, prior to the main rolling. An intermediate (e. g. between the successive treatments) rolling operation may also be effected on the fibres.

The treated fibres are preferably rolled while wet (e. g. from the liquor treatment proper or a subsequent washing operation) and they may be passed between successive pairs of rollers, for example they may be passed through the machine later described.

The fibres are preferably dried after the rolling operation. After drying, the fibres may again be rolled, should further separation be desired.

The softening process may be applied to fibres which have been separated from the other parts of the plant in any way (e. g. by decorticating or by the above described process). For example it may be operated as a continuation of the softening treatment above described.

The chemicals which may be used include ammonium phosphate, di-hydro ammonium phosphate, ammonium sulphate, ammonium carbonate, sodium sulphate, sodium phosphate, sodium ortho-phosphate and sodium carbonate. The chemicals may be used in solution of about 20% strength although in the case of strongly alkaline chemicals weaker solutions may be preferred to reduce discoloration of the fibres.

The treatment with the liquor to effect separation or softening may be carried out under pressure.

It is believed that the hardness of sisal fibres is largely due to the hard cutaneous substances which form the epidermis of the fibre and that the liquor treatment according to the invention removes or weakens the epidermis to such an extent that the subsequent rolling is able to break up the epidermis without substantial destruction of the body of the fibre. For this purpose excessive rolling pressures should be avoided, a pressure of about 56 lbs. on each end of a roller about thirty inches long being adequate. The liquor treatment and rolling also separate the individual units of the fibres which are cemented together in the original raw fibre. So, in this way and in accordance with the amount of separation of the individual units of fibres, due to the extent of treatment with liquor and extent of rolling, various degrees of softening may be obtained. The softening then depends on the duration of the treatment and the number of times of rolling.

A specific form of the process according to the invention as applied to the separation of jute fibres will now be described by way of example.

As soon as possible after harvesting the jute plants are crushed by passing them lengthwise between a succession of pairs of plain or fluted pressure rollers preferably plain wooden rollers which serve to break open the bark and expose the fibes and also to express the plant juices. A small amount of water (preferably at 30–60° C.) may be added to the plants during or just before the crushing. The rollers convey the plants to a station where they are sprayed with sufficient of the expressed juices or with a water infusion from the plants or similar plants at a temperature of 30–60° C., (say 10 to 25% by weight or more) thoroughly to wet the plants. Further rolling through rollers may, if desired, be employed to ensure uniform wetting of the plants. The crushed wetted plants are conveyed to a store where they are stacked and maintained at a temperature of between 30–60° C. and continually kept dampened with the water infusion or expressed juices for a period, which may be one or two days, or more, sufficient for decomposition of the binding matter to take place so as to free the fibre from the other tissues and binding matter. If the plants are stored in the open they should be covered on top. The plants may be washed with water and dried at the end of the heating period, in a mechanical drier, or, in tropical regions by the sun.

Finally the dried plants are subjected to rolling between plain or fluted rollers preferably plain wooden rollers to break up the central stalks, to separate the fibres from the stalks and to separate the fibres from each other. The fibres are then cleaned by brushing, if necessary.

The application of the invention to the recovery of jute fibre, of superior quality, from root cuttings of jute plants, suitable for the replacement of the superior long fibres used in the manfacture of jute goods will now be described with reference to the accompanying drawings, in which:

Figure 1 shows a side view of a machine used for crushing and rolling the plants, Figure 2 is a plan view of the machine, Figure 3 is an enlarged back view of the machine, Figure 4 is a cross-section on the line 4—4 in Figure 3, Figure 5 is a side view of a feed chute used in the machine and Figure 6 is a diagram illustrating the successive steps in the method.

For the purpose of obtaining the cytase-containing liquor, root cuttings, which may first be crushed, are washed with agitation and for a period of about 5 hours or more, in a rotary washing machine 50 (e. g. of the laundry rotary type) at a temperature of 30–60° C. to extract the cytases, about 5 gallons of water are used for each 10 lb. of root cuttings. A small addition of a wetting agent (e. g. the material known under the registered trademark "Teepol" or like material) is made to the washing water in the proportion of about 5 ccs. or 10 ccs., for each 5 gallons of the cytase-containing liquor. The liquor is then transferred to a bath 51 and root cuttings crushed in the machine 52 are then steeped in this liquor for 24 to 48 hours at a temperature which is, preferably, maintained at 40 to 50° C. but may be within the range of 30–60° C. After steeping, the root cuttings are placed in the same or another washing machine (50a) along with the liquor and heated to 30–60° C. using the proportion of about 60 gallons of the liquor to 168 lbs. of root cuttings. The machine is then run for about 1 hour or more up to say three hours or longer, dependent on the quality of the root cuttings. The liquor is then drained and returned to the bath 51 for re-use and the treated root cuttings washed, in the machine 50a, with warm water at 30–60° C. and partially dried. Two washings are given for about 10 to 15 minutes each, the proportion of wash water being in each wash about 60 gallons of water to 168 lbs. of root cuttings.

To facilitate handling and to reduce entanglement of the root cuttings they may be, before treatment, tied into bundles and the bundles enclosed in separate, open-ended, wrappers.

After the partial drying, the root cuttings are removed from the washing machine, undone if bundled and the damp treated root cuttings subjected to high pressure in a pair of rolling mills or presses arranged in tandem and shown at 53 and 54. Each press may apply a load of 15 tons between rollers which are 3 feet 3 inches long. Belt conveyors carry the cuttings to and from the rollers. The cuttings are then rolled between wooden rollers or squeezers 55 (which may be a duplicate of the machine 52) to reduce the moisture content to about 50%. Any parts which so require are re-rolled and may be treated again with the extracted liquor in the washing machine. The treated root cuttings are dried in a drying machine 56 with warm air at about 30° to 50° C. until the moisture content is 20 to 30%. In this condition, the treated root cuttings can be utilised for mixing with the superior fibres and then processed as usual in any jute mill. Otherwise, the treated root cuttings are dried to contain 10% moisture and then put through a teazing machine 57 to produce fibre, and finally again rolled.

The root cuttings may be treated in the above manner either at the place of growth or at the mill. When treated at the place of growth the treated root cuttings may be dried and despatched as such for further use in the mill or they may be put through a teazing machine and the fibres only despatched. When treated at the mill the dried treated root cuttings (or the dried treated root cuttings received from the place of growth) may be mixed with other raw material (e. g. superior fibre, or treated fibre according to the first example) and the mixture passed through the whole of the normal jute mill machinery for the production of yarn. Alternatively the dried treated root cuttings may be teazed and the resulting fibres mixed with superior fibres either at the softener or at the breaker card, the mixture then being processed to yarn.

As an alternative to the steeping of the root cuttings in the bath 51 as above described, they may, if desired be treated by spraying the liquor onto the cuttings in an open chamber.

In the ordinary process of retting jute it is commonly not possible, or not economic, to effect satisfactory separation of the fibres from the bottom ends or root bottoms of the stalks. These bottom ends are accordingly usually cut-off after retting and are known and herein referred to as "root cuttings." In some cases, longer portions of the stalks (herein referred to as "long rejections") may be rejected and cut off. The present invention may, as already stated, be applied to the root cuttings and it may also be used to obtain the fibres from long rejections or from root bottoms, for example after retting of the complete stalks, without cutting the root bottoms from the complete stalks.

It is believed that the binding materials, which hold the fibres to the bark and wood and other parts of the stalk or root cuttings, are pectins, and pectic compounds such as calcium pectate and that most of these materials can be decomposed by the enzymes classified as cytases and present in the juices of the plants. It is further believed that the cytases are retained in the plants even when dried. Such cytases are, for example, pectases, pectinase, protopectinase. The cytases may also be found in takadiastase, certain fruits, vegetables (e. g. tomatoes and potatoes) various fungi and bacteria (e. g. *Granulobacter pectinovorum*) and may be obtained from these sources for use in the invention, if desired.

Certain moulds may also be applied as: *Aspergillus oryzae, Penicillium glaucum, Penicillium italicum, Pythium ultimum,* and others as the Mucors. These are used as accelerators. Certain bacteria may also be employed as accelerators as: *Bacillus asterosporous, Bacillus macerans, Bacillus flesineus, Bacillus polymyxa* and others, as *Granulobacter pectinovorum*.

The process according to the invention may be accelerated by the addition of small amounts (e. g. up to 0.25%) of nutrient mineral salts especially ammonium salts such as ammonium phosphate (e. g. di-ammonium hydrogen phosphate). Other nutrient materials such as carbohydrates (e. g. invert sugar) may also be added.

It is advantageous to maintain the pH value of the extracted liquors used in the invention at between 6 and 8, preferably below 7, and it is also desirable to use soft water for moistening and washing the plants.

It is further advantageous that the juices or water infusion employed contain between 1 and 10% by weight of cytases.

The process according to the invention provides useful by-products. Thus from the plant juices which may be extracted during the initial rolling or crushing, pectin, pectic acid and its compounds may be obtained. To obtain the rectin the liquor may be concentrated by evaporation and then treated with ethyl alcohol or propyl alcohol to precipitate the pectin. The precipitate may be collected and dried. Alternatively calcium or aluminium salts may be used to precipitate the pectin. Cellulose pulp may be obtained from the cellulosic substances separated from the fibres. Such pulp may be used in the manufacture of paper, paper board, fibre board and alcohol, and other useful products.

The crushing machine 52 and 55 mentioned above is shown in detail in Figures 1–5 and will now be described.

The machine comprises an endless conveyor belt 10 which passes over idler drums 11 and 12 at the ends of the machine and is supported by rollers 14 along its lower lap. The belt has a 4-ply canvas centre and is faced with a hard plastic, or hard rubber. The belt is perforated at frequent intervals with small holes to facilitate escape of liquids expressed from the plants. The upper lap of the belt travels from a loading station 15 to a discharge station 16. Between the loading and discharge stations there are fifty-five pairs of nip rollers carried in bearings in pillars 20. The bearings for the lower rollers are adjustably fixed whereas the bearings for the upper rollers are slidable up and down the pillars and are spring pressed downwardly by adjustable springs 22. Each of the upper rollers is provided with a doctor blade 23 engaging the downstream upwardly moving side of the roller and free to slide in guides in the pillars. The upper rollers are covered with hard, tough rubber. Alongside the row of rollers there is a driving shaft 25 which is driven from a motor 26 by chains 27. The shaft has a bevel gear drive 28, 29 to every fifth bottom roller. The intervening rollers and the rollers at the ends of the machine are rotated by the driven rollers by gears 30, 31 and 32.

At the loading station there is a sloping chute 35 down which the plants may be fed to the belt 10. The bottom of the chute is constituted by slats 36 spaced apart to allow stones and other objects which might damage the machine to fall through. An adjustable guard plate 38 is arranged to direct any such bodies away from the belt. At the lower end the chute is supported on a spring-mounted pivot 40 while at the upper end there are motor-driven eccentric means 41 for imparting an up and down vibratory motion to the chute and so to assist in separating foreign bodies.

It is not essential that the machine has fifty-five pairs of rollers. A greater or lesser number may be used.

Various forms of decorticating, scutching or brushing machines may be used to remove the bark and woody material from the fibres, after treatment with the cytase containing liquid the particular form most suitable depending upon the kind of plants being treated. For example with some plants it will be sufficient to pass the dried treated plants through a brushing machine only. In other instances the dried plants may be passed through a machine of the kind in which a revolving bladed drum acts as a beater and the fibres then passed through a brushing machine. In other cases it may be necessary or desirable to subject the plants to more drastic treatment. For example the plants may be treated in a decorticator of the kind in which the plants are held at one end between a chain and a drum while the other end is subjected to the action of knives carried on a drum, the plants then being reversed end for end to enable the whole length thereof to be treated. Alternatively a scutcher may be used which holds, by means of chain and drum, the plants at about the centre of their length and has two opposed scutching belts operating simultaneously on the ends of the plants. The belts have scutching knives or blades, and the plants are supported on plates. The centre portion is subjected to a separate scutching operation in the same direction.

The following are specific examples of the invention as applied to the softening of sisal fibres.

Cytase liquor was first extracted from raw sisal fibre by soaking the fibre in water at 20°–30° C. or even up to 60° C. for 36 hours or more.

The fibres to be softened were first wetted with the fresh cytase liquor at 20°–60° C., rolled ten times, were soaked in the cytase liquor for 24–48 hours or more at a temperature of 20°–60° C. and were then passed, without washing and while wet, through the rolling machine described above but modified to include twenty-five pairs of rollers or more thereby rolling the fibres twenty-five times or more. The rolled fibres were then soaked for 24–48 hours (or more) in a 20% solution of di-hydro ammonium phosphate and under a pressure of 15 to 75 lbs./sq. inch. After this treatment the fibres were again passed through the rolling machine while still wet with the solution and rolled a further ten times. Finally the fibres were washed in hot water, dried and again rolled ten times.

The fibres treated in this way were found to be substantially softened and improved in colour from the normal yellow to a greyish white.

In another example the fibres were wetted for 10 to 15 minutes with cytase liquor at 20 to 60° C., rolled ten times, then steeped at 20°–60° C. for four days (a longer period may be used) in the cytase liquor only, were then rolled twenty-five times before washing, dried and then rolled a further ten times. No treatment with a chemical containing liquor was used. The fibre was considerably softened and the colour was improved. The steeping was carried out under a pressure of 30–50 lbs./sq. inch in a closed vessel (e. g. similar to a closed kier), the pressure being produced by a pump or by compressed air admitted to the vessel.

In carrying out the softening the soaking or steeping temperatures employed are preferably between 20° to 30° and 65° C., the total time of soaking is preferably at least 36 to 42 hours and may be 48 to 60 hours or more up to say four days or even longer, dependent on the temperature and liquor strength used, the hardness of the fibres to be treated and the softness desired for the fibres. The raw fibres may, as already mentioned, be subjected to a crushing or rolling operation before treatment with the liquor.

The softened fibres produced by the process according to the invention may be mixed with other, naturally softer, fibres to obtain a mixture which can be spun to yarn of various desirable types.

When the fibres are treated by soaking, excess liquid may be pressed out of the fibres before they are rolled.

The moulds and bacteria referred to above may be used in the softening process.

The softened fibres may be passed through a combing, teazing or brushing machine. This operation is preferably effected after drying but may be effected while the fibres are still damp (i. e. not quite dry). The machine may be made of corrosion resistant material such as stainless steel.

The process may be applied to the softening of the following fibres or classes of fibres: (a) the Agave family, (b) the Furcraea family, (c) the Yucca family, (d) Phormium tenax, (e) abaca, (f) Samuela carnet-osana, (g) Hesperaloe funifera, (h) Hesperyucca whipplei, (i) Aechmea magdalenae, (j) Musa textilis, (k) Sansevieria fibre, (l) ramie, and (m) palm and palm like fibres.

If desired a small proportion (e. g. 5–10 ccs. to 5 gallons of cytase containing liquors) of "Teepol" or like agent may be added to the cytase liquor for the purpose of assisting the separation and softening of the fibres and reducing odours arising from the fermentation which takes place.

I claim:
1. The process for the separation of the fibres from fibre-containing portions of plants which comprises the steps of preparing by extraction from plants of the same kind fresh cytase-containing liquor, crushing the said fibre-containing plant portions and treating the crushed portions for a period of one to four days at a temperature between 30° and 60° C. with said liquor to effect decomposition of the pectin or pectinaceous compounds of the plants to an extent substantially to free the fibres.

2. The process according to claim 1 in which the liquor is prepared by crushing the plants to extract the juices therefrom.

3. The process according to claim 1 in which the liquor is prepared by crushing the plants and making a water infusion therefrom.

4. The process according to claim 1 in which the liquor is prepared from the fibre-containing plant portions themselves.

5. The process according to claim 1 and including the additional steps of drying the plant portions after treatment and then subjecting the portions to a mechanical operation to strip the woody material from the fibres.

6. The process according to claim 5 and including the steps of subjecting the dried plant portions to a crushing operation prior to the stripping operation.

7. The process according to claim 5 and including the step of subjecting the treated plant portions to a crushing operation prior to the drying step.

8. The process according to claim 1 in which the plant portions are steeped in the cytase-containing liquor.

9. The process according to claim 1 in which the plant portions are sprayed with the cytase-containing liquor.

10. The process according to claim 1 in which the crushing of the plant portions is effected by passing the plants between plain pressure rollers.

11. The process according to claim 10 in which the rollers are of wood.

12. The process for the treatment of vegetable fibrous material which comprises the step of preparing by extraction from vegetable material of the same kind, fresh cytase-containing liquor, and treating the fibrous material for a period of one to four days at a temperature between 20° and 60° C. with said liquor.

13. The process according to claim 12 applied to the softening of vegetable fibres and including the step of repeatedly rolling the fibres after at least a part of the liquor treatment.

14. The process according to claim 12 applied to the softening of vegetable fibres and including the step of rolling the fibres before treatment with the liquor.

15. The process according to claim 14 in which the fibres are wetted before the preliminary rolling.

16. The process according to claim 13 in which the treated fibres are rolled while wet.

17. The process according to claim 13 in which the fibres are passed between successive pairs of rollers to effect the rolling.

18. The process according to claim 13 in which the fibres are dried after treatment with the liquor and rolling and are then subjected to further rolling.

19. The process according to claim 12 in which the treatment with the liquor is effected under pressure.

20. The process according to claim 19 in which a pressure of 15–75 lbs./sq. inch is employed.

References Cited in the file of this patent

UNITED STATES PATENTS

| | | |
|---|---|---|
| 1,086,271 | Campbell | Feb. 3, 1914 |
| 1,133,590 | Toles | Mar. 30, 1915 |
| 1,421,613 | Takamini | July 4, 1922 |
| 1,473,901 | Carbone | Nov. 13, 1923 |
| 2,407,227 | Earle | Sept. 10, 1946 |

FOREIGN PATENTS

| | | |
|---|---|---|
| 1,031,036 | France | Jan. 16, 1951 |

OTHER REFERENCES

Oppenheimer et al.: Ferments and Their Actions, 1901, Chas. Griffin Longon, pp. 187–190.

Oppenheimer: Die Fermente und ihre Wirkungen, 5th. Auflage, 1st Band, 1925, pp. 528, 750–753.

Waksman et al.: Enzymes, 1925, published by Williams and Wilkins, p. 260.

Tauber: Chemistry and Technology of Enzymes, 1949, John Wiley & Sons, Inc., page 401.